United States Patent [19]

Heep et al.

[11] Patent Number: 4,948,017

[45] Date of Patent: Aug. 14, 1990

[54] ROTARY FEEDER

[75] Inventors: Dieter Heep, Bergatreute; Paul Vogel, Weingarten; Gerhard Reichert, Ravensburg, all of Fed. Rep. of Germany

[73] Assignee: Waeschle Maschinenfabrik GmbH, Ravensburg, Fed. Rep. of Germany

[21] Appl. No.: 356,178

[22] Filed: May 23, 1989

[30] Foreign Application Priority Data

May 27, 1988 [DE] Fed. Rep. of Germany ....... 3818145

[51] Int. Cl.⁵ .............................................. G01F 11/10
[52] U.S. Cl. .................................. 222/368; 29/426.1; 29/801; 414/219
[58] Field of Search ................ 222/368, 367, 361–363; 414/219, 745.3; 29/801, 426.1

[56] References Cited

U.S. PATENT DOCUMENTS

| 3,064,826 | 11/1962 | Ettinger | 414/746.3 X |
|---|---|---|---|
| 3,098,570 | 7/1963 | Lindemann | 414/746.3 |
| 3,750,902 | 8/1973 | Starrett | 222/368 X |
| 4,059,205 | 11/1977 | Heyl | 222/368 |
| 4,076,150 | 2/1978 | Didrickson | 222/368 |
| 4,275,824 | 6/1981 | Bourne | 222/368 X |
| 4,310,281 | 1/1982 | Egashira | 414/746.3 X |
| 4,602,727 | 7/1986 | Jackson | 222/368 |
| 4,784,298 | 11/1988 | Heep et al. | 222/368 X |

FOREIGN PATENT DOCUMENTS

| 3722913 | 1/1989 | Fed. Rep. of Germany | 222/368 |
|---|---|---|---|
| 0163246 | 9/1983 | Japan | 29/426.1 |
| 368975 | 8/1973 | U.S.S.R. | 29/426.1 |
| 486890 | 1/1976 | U.S.S.R. | 29/801 |

Primary Examiner—Kevin P. Shaver
Attorney, Agent, or Firm—Henry M. Feiereisen

[57] ABSTRACT

A rotary feeder includes a housing in which a rotary member is supported between two lateral bearing caps, with one journal fixedly supported in one bearing cap and the other journal loosely supported in the other bearing cap. For facilitating maintenance and cleaning of the rotary feeder, a carriage is securely mounted to the one bearing cap accommodating the fixed bearing. The carriage is movable and suitably guided in axial direction of the rotary member by at least the axial length of the rotary member so as to allow removal and return of the rotary member from and back into the housing in an accurate and safe manner.

16 Claims, 4 Drawing Sheets

ROTARY FEEDER

BACKGROUND OF THE INVENTION

The present invention refers to a feeding apparatus such as a rotary feeder or cellular wheel sluice, and in particular to a rotary feeder of the type including a housing provided with two lateral bearing caps, with one bearing cap accommodating a fixed bearing and the other bearing cap accommodating a loose bearing for supporting the shaft of a rotary member.

Rotary feeders of this type are known and used in pneumatic transporting plants for a variety of purposes. For inspection and/or maintenance and also during change of bulk material, especially during a color change, it is required to periodically dismantle the rotary feeder. Since the rotary member is supported in a loose bearing in one bearing cap and in a fixed bearing in the other bearing cap, with the motor drive being accommodated on the side of the loose bearing, the dismantling of the rotary feeder was carried out by disassembling the bearing cap with the fixed bearing and pulling it out together with the rotary member from the housing. Auxiliary devices were used in order to avoid improper handling during dismantling and to counter any possible danger of accident especially when large and thus heavy rotary feeders are concerned. Such auxiliary devices as e.g. round rods mounted to the respective bearing cap and received in guides at the outside of the housing have been proven unsatisfactory.

SUMMARY OF THE INVENTION

It is thus an object of the present invention to provide an improved rotary feeder obviating the afore-stated drawbacks.

This object and others which will become apparent hereinafter are attained in accordance with the present invention by mounting to the one bearing cap accommodating the fixed bearing a carriage which is movable and guided in direction of the center axis of the rotary member by at least the axial length of the rotary member so as to allow removal of the rotary member from said housing.

Through the provision of a carriage in combination with a guiding device, the rotary member can be removed from and returned into the housing precisely in its axis. The rotary member which is pulled out from the housing is accessible from all sides to allow complete cleaning and thus does not need to be transported to remote locations. The rotary member is removed from and returned back into the housing in a fast, convenient and secure manner. The occurrence of a misalignment or tilting is eliminated so that damages of the sealed end faces of the blades of the rotary member and of the inner wall of the housing as well as of the journal of the rotary member and of the loose bearing in the respective bearing cap still remaining in the housing are avoided.

According to a feature of the present invention, the guide device includes at least two guide rods connected to the housing and arranged parallel to the center axis of the rotary member at each side of the housing. The guide rods extend unsupported beyond the housing by at least the axial length of the rotary member.

According to yet another feature of the present invention, the carriage is a U-shaped frame with the transverse shank being connected to the bearing cap which accommodates the fixed bearing. Suitably, the carriage is provided with rollers which run along each guide rod for guiding the carriage in accurate manner.

Especially in those instances in which rotary feeders of considerable size and weight are concerned, it is preferred to provide an additional support unit which supports the rotary member when being pulled out from the housing Such a support unit may be provided by mounting a bearing block between two two-armed levers, with each of which being swingably mounted to the guide rods. When being pulled out of the housing together with the rotary member, the carriage abuts the levers to force them to swing about an axis perpendicular to the center axis of the rotary member to thereby swivel the bearing block under the rotary member for support.

According to a variant, the support unit includes a U-shaped bracket which is swingably mounted to the guide rods about an axis perpendicular to the center axis of the rotary member by manual actuation of a handle. Suitably, a locking mechanism is provided which allows the bracket to maintain its position with respect to the rotary member.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
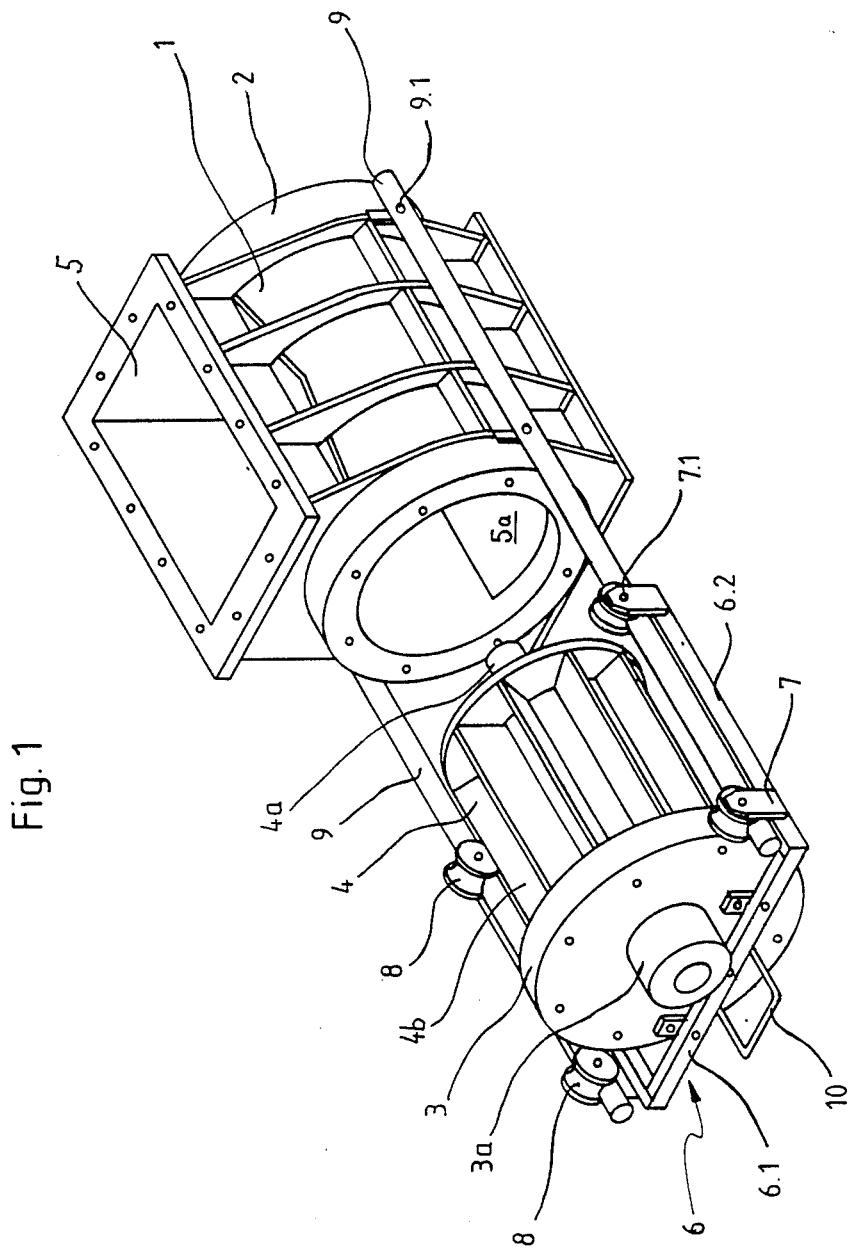
FIG. 1 is a perspective view of a first embodiment of a rotary feeder in accordance with the present invention, with the rotary member being in disassembled position.

Referring now to the drawing, and in particular to FIG. 1, there is shown a perspective view of a rotary feeder or cellular wheel sluice including a housing 1 provided with an inlet 5 and an outlet 5a. The rotary feeder is provided with a rotary member 4 being disassembled or removed from the housing 1 to allow access thereto. The rotary member 4 is mounted on a shaft (not shown) which is rotatably supported in lateral bearing caps 2, 3 of the housing 1 via respective journals 4a. In the assembled state of the rotary feeder, the journal 4a is loosely supported in the bearing cap 2 by means of a suitable bearing which is not shown in FIG. 1 while the other journal 4a is supported in the bearing cap 3 by means of a fixed bearing 3a. For transporting material such as bulk material from the inlet 5 to the outlet 5a, the rotary member 4 includes a plurality of blades 4b. Although not shown in the drawing, the rotary member 4 is operatively connected to a drive which is suitably accommodated at the side of the bearing cap 2.

Connected to the outside of the bearing cap 3 is a U-shaped handle 10 as well as a transverse shank 6.1 which is part of a U-shaped carriage or frame generally designated by reference numeral 6. The carriage 6 is further provided with longitudinal shanks 6.2 extending at each side of the rotary member 4 in axial direction thereof Attached to each longitudinal shank 6.2 is a pair of spaced fishplates 7 which project upwardly and support short axles 7.1 at their ends distant to the longitudinal shanks 6.2. Supported on the axles 7.1 are concave-shaped rollers 8 which run along guide rods 9 extending parallel to the center axis of the rotary member 4 at each side of the housing 1 and fixedly connected to the housing 1 by means of bolts 9.1. As shown in FIG. 1, the guide rods 9 are of circular section so as to complement the concave profile of the rollers 8 and extend unsupported beyond the housing 1, at least by the axial length of the rotary member 4 to allow the rotary member 4 to be pulled out to a sufficient degree.

When removing the rotary member 4 from the housing, the operator grasps the handle 10 and moves the carriage 6 and thus the rotary member 4 outwardly, with the rollers 8 running along the guide rods 9 for accurate guidance.

It will be appreciated that adjusting screws (not shown) may be provided for ensuring accurate parallelism of the guide rods 9. For the same reason, it may be suitable to have one pair of rollers 8 which is assigned to the same guide rod 9 to be fixedly supported on its axles 7.1 in axial direction while the other pair of rollers 8 is loosely supported on its axles 7.1 in axial direction.

Although not shown in the FIG. 1, suitable end stops are provided in order to limit the advancement of the carriage 6 in axial direction.

Figure 2:
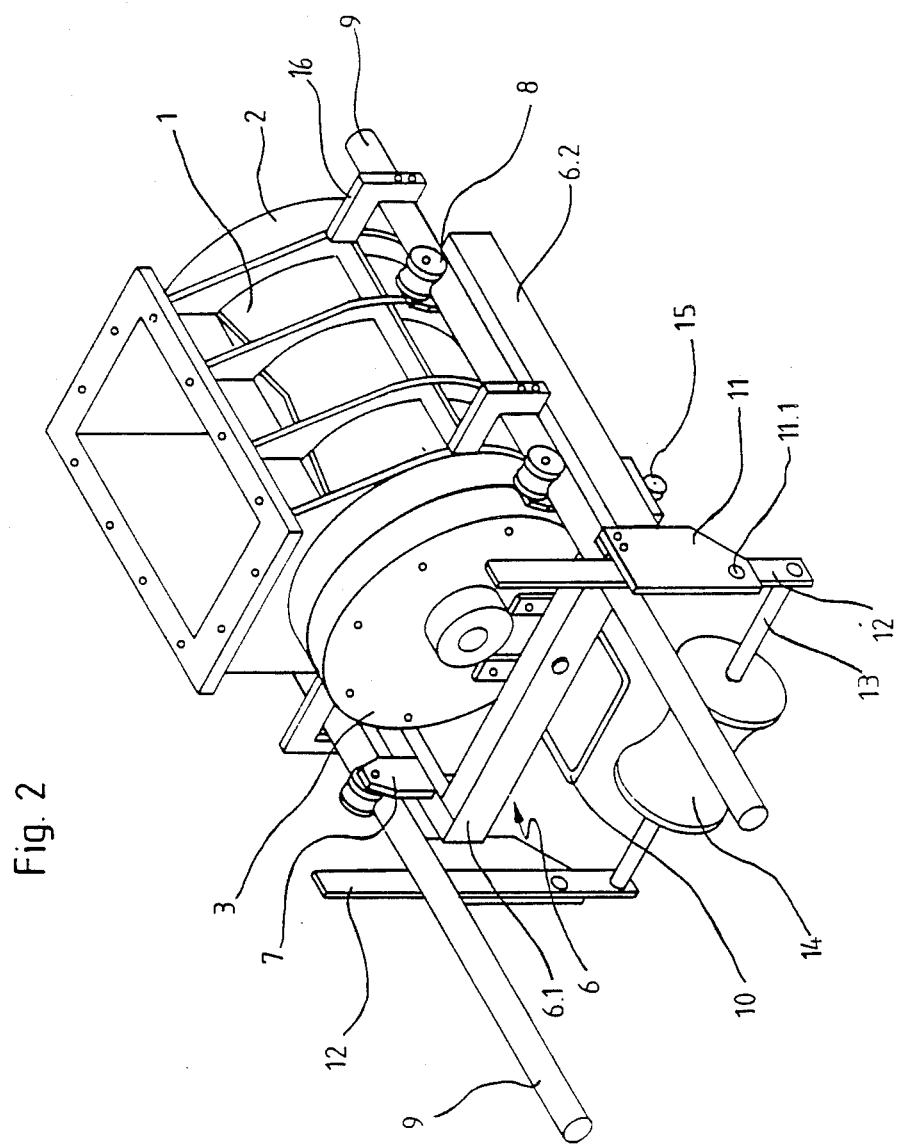
FIG. 2 is a perspective view of a second embodiment of a rotary feeder in accordance with the present invention and in assembled position.

Turning now to FIG. 2, there is shown a perspective view of a second embodiment of a rotary feeder according to the invention, with the rotary member 4 being moved into the housing 1. In the rotary feeder according to FIG. 2, same reference numerals are used for identical parts as shown in FIG. 1.

In the rotary feeder according to FIG. 2, the guide rods 9 are connected to the housing 1 via brackets 16. Running along the guide rods 9 are the rollers 8 which are supported on the axles 7.1 mounted to the fishplates 7. In contrast to the first embodiment of the rotary feeder, the fishplates 7 of the U-shaped carriage 6 are arranged at the inside of the guide rods 9 to allow assembly of an additional support unit for the rotary member 4. The support unit includes opposing bearing plates 11 mounted externally to the guide rods 9 at a suitable distance to the side face of the housing 1 and projecting downwardly. Supported by each bearing plate 11 is a two-armed lever 12 which is mounted to the bearing plate 11 at pivot 11.1 so as to swing about an axis perpendicular to the center axis of the rotary member 4. At their lower ends, the levers 12 are connected to each other via a crossbar 13 which rotatably supports a bearing block in form of a roller 14.

The arrangement of the levers 12 is such that they extend in axial elongation of the carriage 6 which is mounted to the bearing cap 3. In vicinity of its junction with the transverse shank 6.1, each longitudinal shank 6.2 is provided at its underside with a small roller 15.

Figure 3:
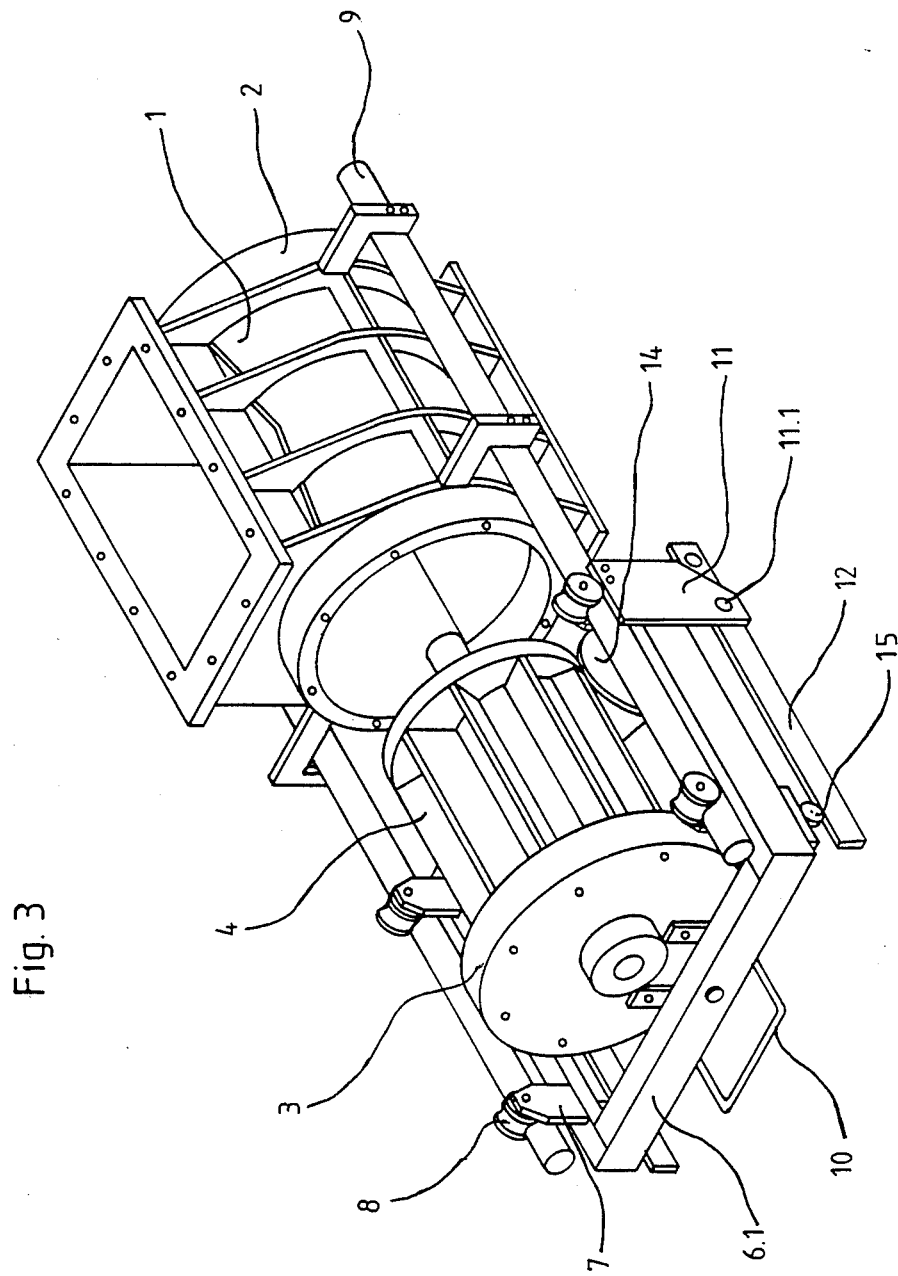
FIG. 3 is a perspective view of the rotary feeder according to FIG. 2, with the rotary member being in disassembled position.

When disassembling the rotary feeder, the operator grasps the handle 10 to pull out the carriage 6 with the rotary member 4. Upon movement in axial direction, the carriage 6 abuts the levers 12 to thereby swing them about the pivots 11.1 from a vertical orientation as shown in FIG. 2 to a horizontal orientation as shown in FIG. 3. Simultaneous with the swinging of the levers 12, the rollers 15 run on the upper side of the levers 12 to accurately guide the movement of the carriage 6, and the roller 14 swings to the raised position as sown in FIG. 3 in which the roller 4 supports the rotary member 4. The second embodiment is thus especially suitable for rotary feeders of considerable weight.

When sliding the bearing cap 3 and the rotary member 4 back into the housing 1, the levers 12 return to the position as shown in FIG. 2 by the weight of the roller 14.

It will be appreciated that the rotary feeder according to FIG. 2 also may include suitable end stops in order to limit the advancement of the carriage 6 in axial direction.

Figure 4:
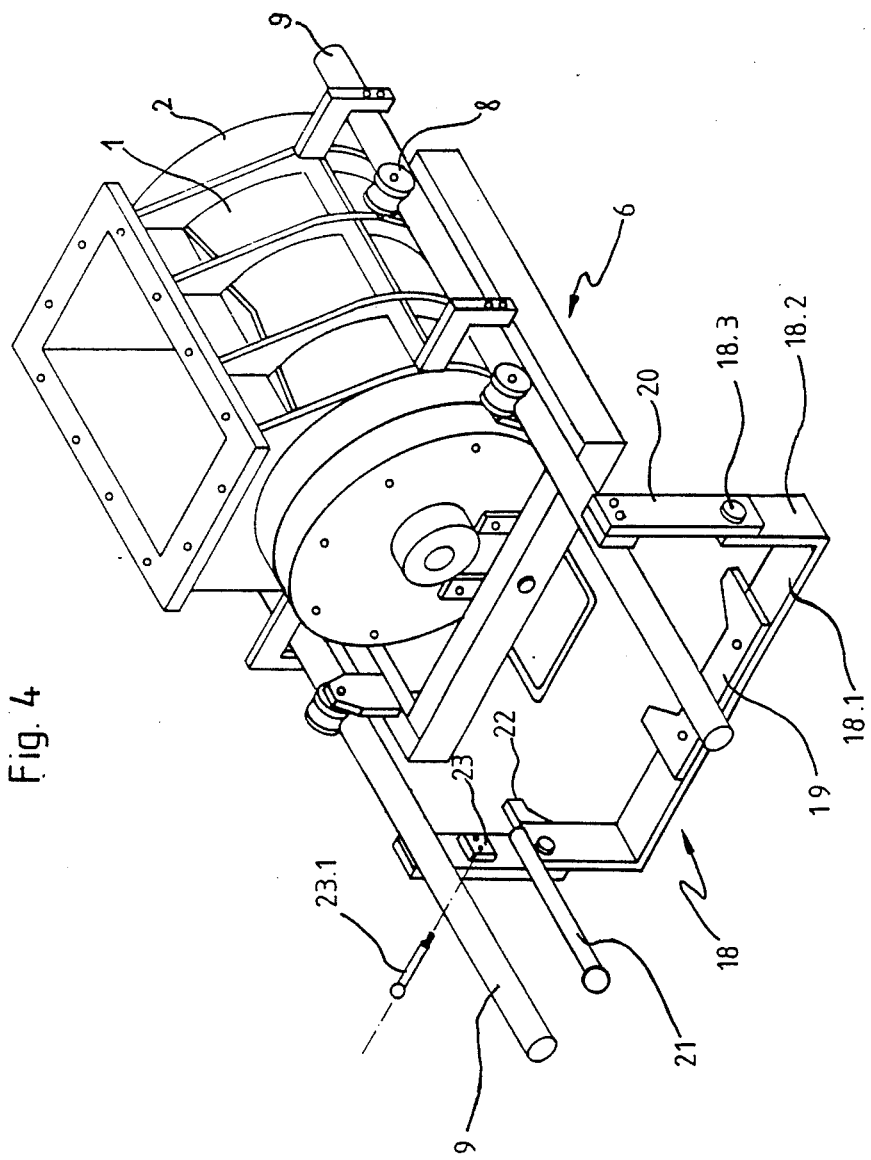
FIG. 4 is a perspective view of a third embodiment of a rotary feeder in accordance with the present invention and in assembled position.

Turning now to FIG. 4, there is shown a third embodiment of a rotary feeder in accordance with the present invention. Same reference numerals have been used for identical parts as shown in FIG. 2. The rotary feeder of FIG. 4 is also equipped with a support unit which in contrast to the automatically actuated design of the second embodiment is now manually operated.

The support unit according to FIG. 4 includes a U-shaped bracket generally designated by reference numeral 18 and including a transverse shank 18.1 provided at a central position thereof with a supporting plate 19, and two longitudinal shanks 18.2 which are each swingably mounted at pivot 18.3 to the lower section of a link 20. The links 20 are securely connected to the guide rods 9 at a distance to the side faces of the housing 1. Attached to one longitudinal shank 18.3 is a handle 21 which extends outwardly in axial direction to allow easy actuation by an operator. Projecting inwardly from one of the longitudinal shanks 18.2 is a catch 22 which cooperates with a stop member 23 mounted to the pertaining link 20.

After pulling the carriage 6 to move the rotary member 4 into the respective end position which may be defined by suitably located end stops (not shown), the bracket 18 swings counterclockwise by 90° by means of the handle 21, with the catch 22 latching behind the stop member 23 which is suitably attached to the link 20 so as to retract when being passed by the catch 22. Once, the catch 22 moves past the stop member 23, the latter automatically returns to its illustrated locking position so as to lock the bracket 18. By swinging the bracket 18 counterclockwise in the described manner, the supporting plate 19 bears against the underside of the rotary member 14 to provide additional support thereof.

For releasing the bracket 18, the stop member 23 is retracted by means of a grip 23.1 which is indicated in FIG. 4 and suitably connected to the stop member 23. Then, the handle 21 is actuated in clockwise direction to return the bracket 18 into its initial position.

While the invention has been illustrated and described as embodied in a rotary feeder, it is not intended to be limited to the details shown since various modifications and structural changes may be made without departing in any way from the spirit of the present invention.

What is claimed as new and desired to be protected by Letters Patent is set forth in the appended claims:

1. A rotary feeder, comprising:
   a housing defining an interior space and including first and second lateral bearing caps;
   a rotary member adapted for accommodation within said interior space of said housing and having a shaft, said rotary member defining a center axis and having an axial length;
   first bearing means for fixedly supporting said shaft in one of said bearing caps and second bearing means for loosely supporting said shaft in the other one of said bearing caps;

a carriage connected to said first bearing cap and being movable in direction of said center axis by at least said axial length; and guide means for guiding said carriage during its movement along the center axis.

2. A rotary feeder as defined in claim 1 wherein said guide means includes at least two guide rods connected to said housing, said guide rods being arranged parallel to said center axis of said rotary member at each side of said housing and extending unsupported beyond said housing by at least said axial length.

3. A rotary feeder as defined in claim 1 wherein said carriage includes a U-shaped frame having a transverse shank connected to said one bearing cap.

4. A rotary feeder as defined in claim 2 wherein said guide means further includes rollers connected to said carriage and running along said guide rods.

5. A rotary feeder as defined in claim 4 wherein the number of rollers is four and each guide rod cooperates with two of said four rollers.

6. A rotary feeder as defined in claim 4 wherein said guide rods are of circular cross section, said rollers having concave profile which is complementary to said circular cross section of said guide rods.

7. A rotary feeder as defined in claim 1 further comprising means for suspending said carriage under said guide means.

8. A rotary feeder as defined in claim 1, and further comprising support means cooperating with said guide means for supporting said rotary member when being removed from said housing.

9. A rotary feeder as defined in claim 8 wherein said support means includes a bearing block swingable into a position under said rotary member when said rotary member is removed from said housing.

10. A rotary feeder as defined in claim 9 wherein said support means further includes two two-armed levers swingably mounted to said guide rods and opposing each other, said levers swinging about an axis perpendicular to said center axis of said rotary member and supporting said bearing block between their lower ends.

11. A rotary as defined in claim 10 wherein said levers extend along the path of said carriage so that a movement of said carriage in a direction toward said levers causes the carriage to contact said levers and to swing said levers about their axis.

12. A rotary feeder as defined in claim 9 wherein said bearing block is a roller rotatable about an axis perpendicular to said center axis of said rotary member.

13. A rotary feeder as defined in claim 10, and further comprising rollers connected to said carriage at the underside thereof for running on said levers when said levers swing about said axis.

14. A rotary feeder as defined in claim 8 wherein said support means includes a U-shaped bracket arranged below said guide means, said U-shaped bracket being swingably mounted about an axis perpendicular to said center of said rotary member and including a cross piece for supporting said rotary member upon removal of said rotary member.

15. A rotary feeder as defined in claim 14, and further comprising locking means for locking said U-shaped bracket when said U-shaped bracket has been swung about its axis for supporting said rotary member.

16. A rotary feeder as defined in claim 15, and further comprising link means for connecting said U-shaped bracket with said guide rods, said locking means including a catch connected to said U-shaped bracket and a stop member mounted to said link means so as to allow an automatic locking of said U-shaped bracket.

* * * * *